United States Patent

[11] 3,603,269

[72] Inventor  Wayne H. Royer
               York, Pa.
[21] Appl. No. 11,580
[22] Filed     Feb. 16, 1970
[45] Patented  Sept. 7, 1971
[73] Assignee  Teledyne, Inc.
               York, Pa.

[54] OVEN LOADING MEANS
     5 Claims, 9 Drawing Figs.
[52] U.S. Cl. .................................................. 107/57 A,
                                                               198/DIG. 13
[51] Int. Cl. ..................................................... A21b 3/07
[50] Field of Search ......................................... 107/57 A,
                        57 D, 57 R, 59, 60; 198/23, 24, DIG. 13

[56]              References Cited
               UNITED STATES PATENTS
2,648,298   8/1953   Holbeck ....................... 107/57 A
3,202,115   8/1965   Jones ............................ 107/57 A
3,362,519   1/1968   Skarin .......................... 107/57 A Primary Examiner—Price C. Faw, Jr.
Attorney—Otto Moeller ABSTRACT: An apparatus for transversely conveying at timed intervals successive rows of pans of dough to a position in front of the loading opening of a commercial type oven and for pushing such successive rows of pans into the oven onto successive trays of a continuously operating endless oven tray conveyor. The pans to be conveyed are made of a magnetic material and the pan conveyor conveying surface is made of a nonmagnetic material. Beneath the pan conveyor conveying surface are a series of electromagnetic coils arranged to be energized at such times only when the conveying surface is operating to exert a pulling force on the pans substantially increasing the pressure of the pans against the conveying surface and minimizing movement of the pans relative to the conveying surface during starting, stopping and running time of the pan conveyor. The pan conveyor is arranged to be intermittently operated through a predetermined measured linear travel to present successive rows of pans to the oven loading opening in position to be pushed therethrough onto successive oven trays. At such times that the pan conveyor is not operating, the electromagnetic coils are arranged to be deenergized, allowing a continuously operating pusher timed with the oven tray conveyor, to traverse the pan conveyor conveying surface and push successive rows of pans therefrom onto successive trays of the oven tray conveyor.

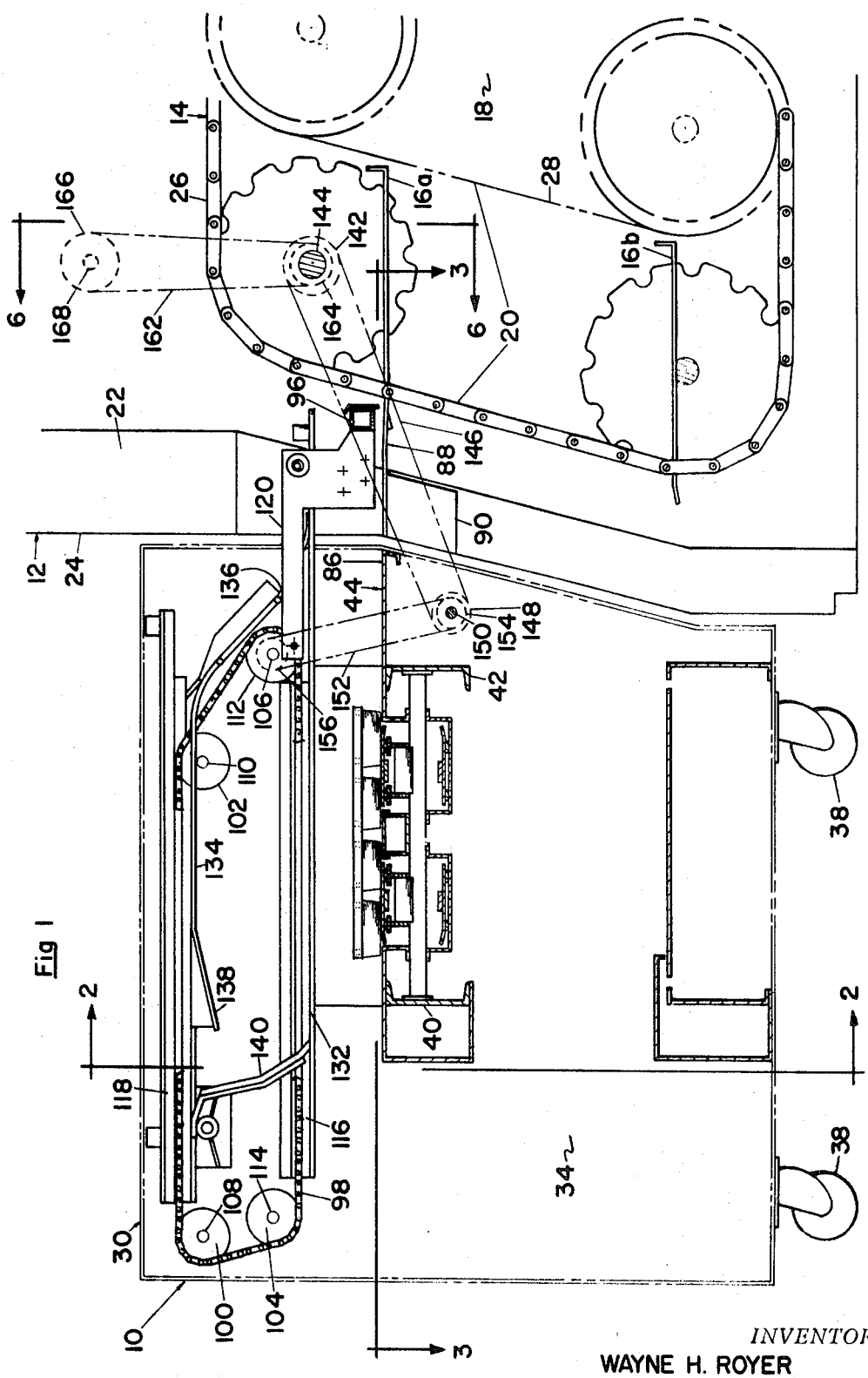

INVENTOR.
WAYNE H. ROYER
BY
Otto Moeller

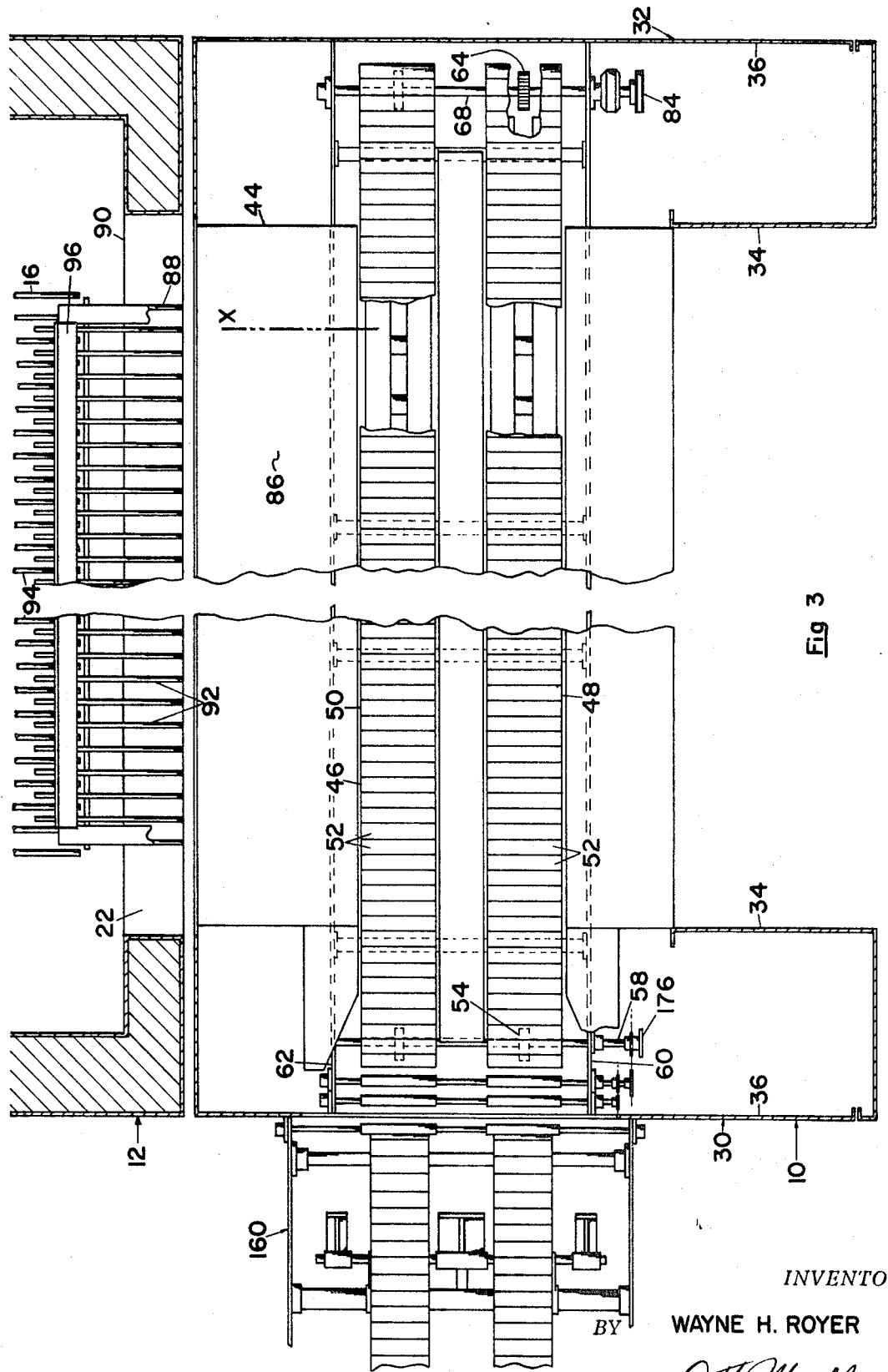

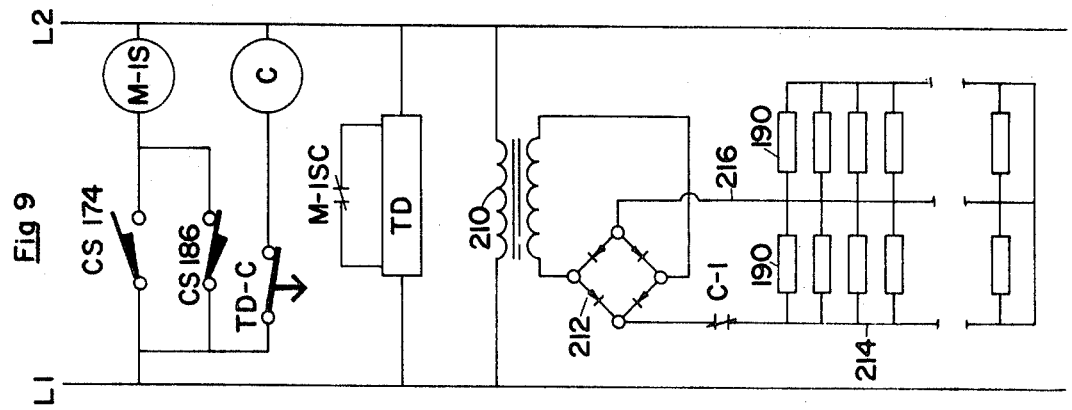
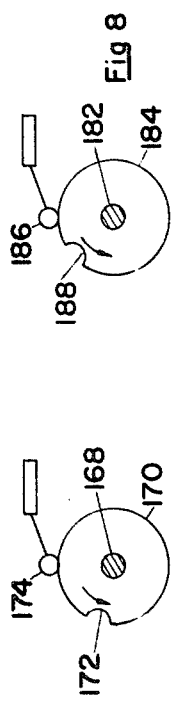
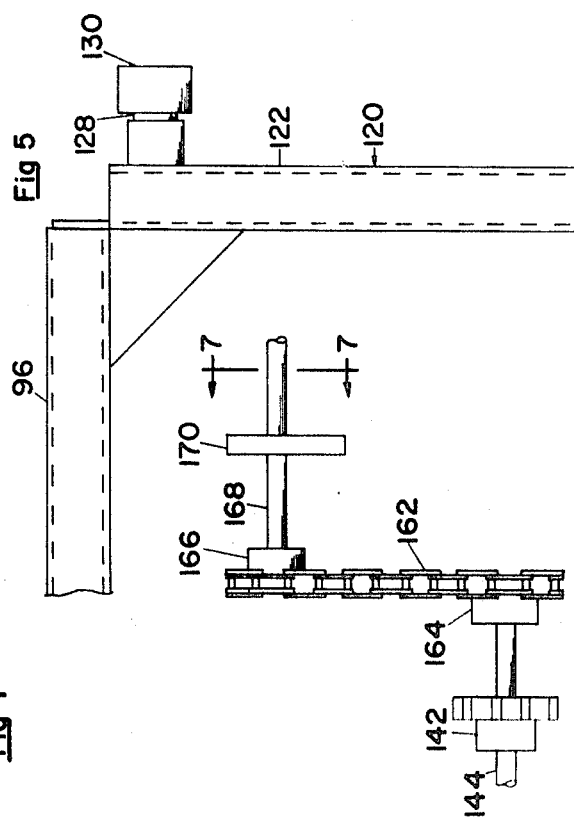
INVENTOR.
WAYNE H. ROYER

3,603,269

1

OVEN LOADING MEANS

BACKGROUND OF THE INVENTION

This invention relates generally to article handling and conveying apparatus for periodically transferring segregated rows of a predetermined number of articles from a first conveyor along which first conveyor the articles are advanced in single file, onto a second conveyor operating in a direction normal to the first conveyor.

The invention finds particular utility in the commercial baking industry and includes an infeed conveyor arranged to transport successive groups of pans of proofed dough single file in a transverse row in front of the loading opening of an oven and from which infeed conveyor successive transverse rows of pans are pushed by a pusher through the loading opening onto successive trays of an oven tray conveyor. It is customary and essential in such installations that the infeed conveyor be stopped, each time a row of pans has been conveyed into position to be loaded, for such time at least that the pusher traverses the infeed conveyor on its extending or pan pushing stroke, in order to prevent dislocation and collision of the pans as they are being pushed. However, with the abrupt stopping of the infeed conveyor and the rate of travel thereof, particularly with the present day trend toward higher production rates, necessitating higher conveyor speeds, prior installations have resulted in haphazard inertial movement of the pans relative to the conveying surface of the infeed conveyor. As a consequence the pans collide rather violently, frequently resulting in collapse and damage to the proofed dough product. Additionally, the pans in the successive groups of pans advancing along the infeed conveyor are customarily spaced a small uniform distance apart and it is desirable to maintain as nearly as possible such uniform spacing as the row of pans are transferred to the oven trays to provide a uniform circulation of heated air about all of the pans. The haphazard dislocation of the pans in prior arrangements has seriously impaired such uniform circulation of heated air, frequently resulting in nonuniform baking of the bakery products.

The present invention provides a conveying system for delivering successive groups of pans of dough in single file to the loading opening of an oven and pushing such successive groups of pans of dough through the oven loading opening onto an oven conveyor in a direction normal to their direction of travel to a position in front of the loading opening, and control means for the conveying system, that retains such control of the pans throughout their travel as to overcome the above and other deficiencies of prior conveying systems.

SUMMARY OF THE INVENTION

Successive groups of pans formed of a magnetic material are periodically released to an endless pan infeed conveyor arranged to advance the pans in single file transversely in front of the loading opening of the oven. The pan infeed conveyor has a conveying surface made of a nonmagnetic material, and a series of electromagnets are disposed in spaced relation along and beneath the conveying surface of the pan infeed conveyor. The electromagnets are energized only when the pan infeed conveyor is moving, in effect increasing the weight of the pans and increasing the frictional resistance between the pans and the conveyor above the frictional resistance exerted by the normal weight of the pans to minimize movement of the pans relative to the infeed conveyor during starting, stopping and running time of the infeed conveyor. Control means is provided for intermittently operating the infeed conveyor through a measured linear travel such that successive rows of pans of a number that can be accommodated on the oven conveyor trays are brought into position in front of the oven loading opening in readiness to be pushed by a pusher from the infeed conveyor through the oven opening onto successive oven tray conveyors. During such time as the infeed conveyor is not operating, the electromagnets are deenergized, allowing the pans to be freely pushed from the infeed conveyor onto the oven trays. The invention further contemplates a system as above described in which the oven tray conveyor an the pusher are operated continuously.

BRIEF DESCRIPTION OF THE DRAWINGS

FIG. 1 is a longitudinal vertical sectional view through the oven loading apparatus and the adjacent portion of the oven to which it is applied;

FIG. 3 is a sectional view taken on line 3–3 of FIG. 1;

FIG. 5 is an enlarged fragmentary plan view of the pan pushing carriage and pusher bar;

FIG. 6 is a sectional view taken on line 6–6 of FIG. 1;

FIGS. 7 and 8 are views of the infeed conveyor and pusher controlling cams; and

FIG. 9 is an electrical diagram showing the operation of the conveying system.

Figure 4:
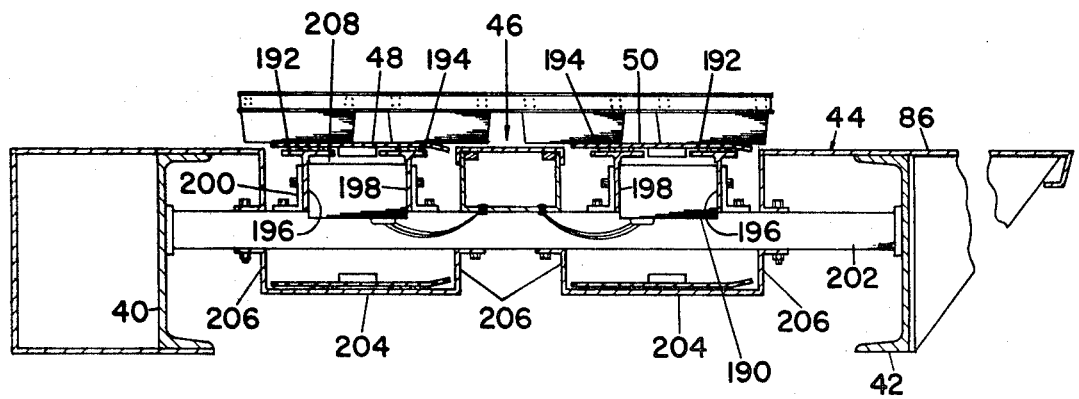
FIG. 4 is an enlarged sectional view of the infeed conveyor shown in FIG. 1.

Referring particularly to FIG. 1, my improved pan transfer device 10 is shown, for purpose of illustration, as applied to a commercial oven 12 of the traveling tray type. Since the construction of such ovens is well known, only the front portion to which the pan transfer 10 is applied is shown in the drawings.

The oven is provided with an endless tray conveyor 14 for conducting trays 16 in a closed circuit through the oven chamber 18. The tray conveyor 14 includes an upright run 20 is close proximity to an oven opening 22 in the oven front wall 24. The tray conveyor, illustrated rather diagrammatically in FIG. 1, may be of any suitable type well known in the art, preferably as shown in Daniel W. Miller U.S. Pat. No. 3,260,351 granted July 12, 1966, and includes endless chains 26, one at each side of the oven. A plurality of transversely extending equidistantly spaced trays 16 are pivotally supported at their ends by and between the chains 26, and a stabilizing chain 28 maintains the trays 16 in horizontal position as they travel upwardly along the upright run 20 past the oven loading opening 22. The tray conveyor chains 26 and the stabilizing chain 28 are continuously driven from a motor, not shown, that may be conveniently located and supported, preferably between the inner and outer sheets of an oven sidewall near the front of the oven. Any suitable drive connecting means, not shown, may be employed for operating the tray conveyor and stabilizing chains from the motor, appropriately the means shown and described in the above referred to patent.

The pan transfer device 10 includes a pair of generally rectangular compartments 30 and 32 in confronting relation with respect to the lower portion of the oven front wall 24 and disposed in laterally spaced relation at opposite sides of the oven opening 22. The compartments 30 and 32 are constructed of suitable angle iron and other structural elements, at least partially enclosed by sheet metal plates including inner and outer sheet metal plates 34 and 36. The compartments 30 and 32 of the pan transfer device 10 are rigidly tied together by suitable transversely extending members. For convenience the pan transfer device 10 is mounted on casters 38 whereby it may be readily moved as a unit toward or away from the oven front wall 24 into or out of operative relation with respect to the oven 12.

Spanning the space between the compartments 30 and 32 subjacent the bottom of the oven loading opening 22 are longitudinally spaced transversely extending front and rear channel members 40 and 42 suitably secured at their ends to structural elements of the compartments 30 and 32 providing support means for a generally horizontal pan supporting surface 44 across which successive rows of pans P are pushed through the loading opening 22 onto successive trays 16 of the tray conveyor 14.

The endless conveyors 48 and 50 of the infeed conveyor 46 are illustrated as being of well-known flattop chain link construction, composed of a plurality of platelike links 52 hingedly joined one to another. Endless conveyors 48 and 50 are trained at their infeed ends over sprockets 54 keyed on driven shaft 58 journaled in suitable bearings carries by front and rear plate members 60 and 62 suitably secured in compartment 30. At their opposite ends, endless conveyors 48 and 50 are trained over sprockets 64 keyed on drive shaft 68 journaled in suitable bearings carried by front and rear plate members 60 and 62 suitably secured in compartment 32.

In the present instance, the preferred nonmagnetic material for the conveyor 48 and 50 is nonmagnetic stainless steel because of its resistance to wear caused by pushing the pans there across in loading the pans onto the trays of the oven conveyor, though if desired suitable plastic or other nonmagnetic materials may be employed.

The infeed conveyor 46 is operated by a motor M-1 mounted on a bracket 76 suitably supported in the compartment 32 on frame elements thereof. The drive means includes a chain 78 trained over a sprocket 80 on the motor shaft 82 and a sprocket 84 on an extension of the conveyor drive shaft 68. The control means for intermittently operating the infeed conveyor motor M-1 will be described hereinafter in detail.

The pan supporting surface 44, previously referred to, also includes a plate like shelf 86 secured in suitable manner on the rear channel member 42 and that extends rearwardly from adjacent the rearward side of the top run of the infeed conveyor 46 to a position adjacent the oven opening 22. The pan supporting surface 44 additionally includes a grid like auxiliary support 88 disposed in the oven opening 22, secured to a suitable supporting structure as, for example, a conventional air curtain duct 90. The support 88 includes a plurality of laterally spaced rods 92, as best shown in FIG. 3, the rearward end portions of which interdigitate with the forward ends of the rods 94 of the oven trays 16.

An elongated transversely extending pusher bar 96 of the pan transfer device 10 is mounted and operated, in a manner hereinafter described, for movement in a cyclic path rearwardly across and in close proximity to the pan supporting surface 44 to push successive rows of pans from the top run of the endless conveyor 46 across the platelike shelf 86 and auxiliary grid support 88 onto successive trays 16 of the oven tray conveyor 14, and in a forward elevated path above the level of a succeeding row of pans that is being conveyed to a position in front of the loading opening 22 by the endless infeed conveyor 46.

Figure 2:
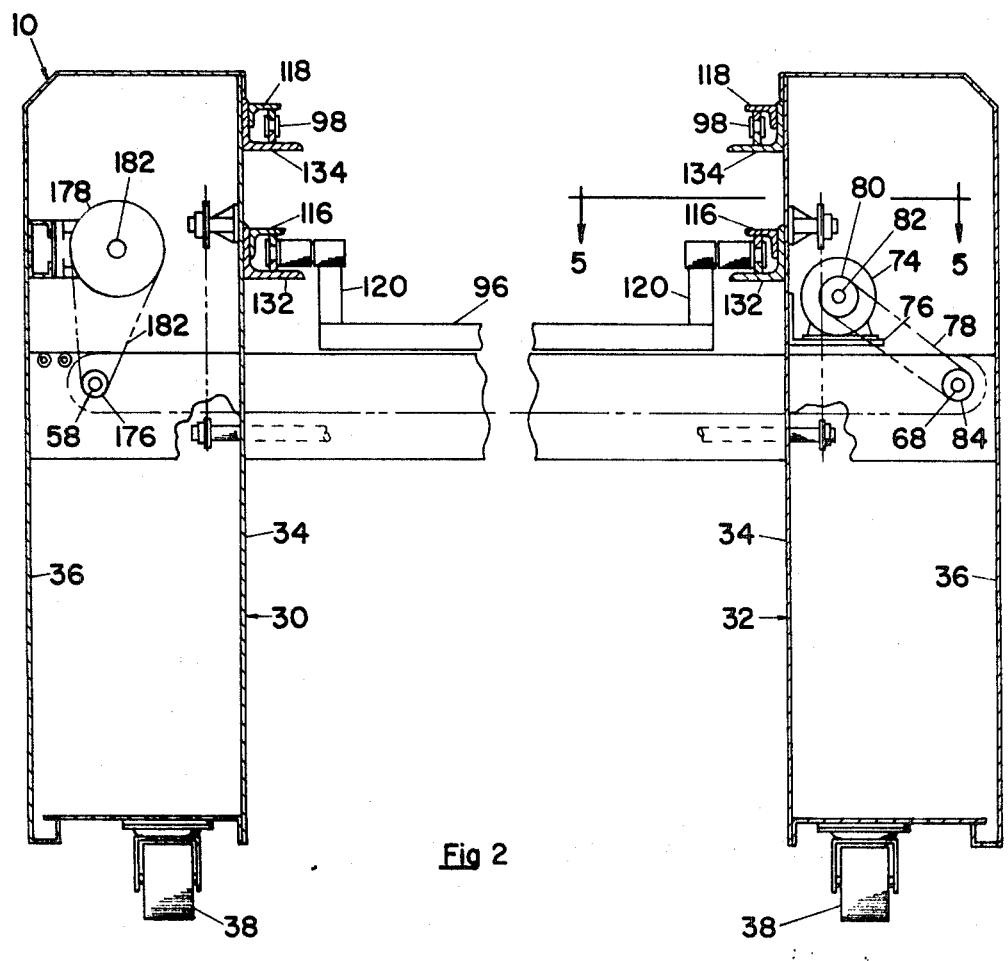
FIG. 2 is a sectional view taken on line 2–2 of FIG. 1.

The driving means for operating the pusher bar 96 includes a pair of longitudinally extending endless chains 98, each being disposed adjacent the inwardly facing side of the inner sheet 34 of a respective compartment 30 and 32, as best shown in FIGS. 1 and 2. Each of the chains 98 is trained around longitudinally spaced upper forward and rearward sprockets 100 and 102 to form a horizontal upper chain run, and around longitudinally spaced lower forward and rearward sprockets 104 and 106 to form a horizontal lower chain run. The upper forward and rearward sprockets 100 and 102 are respectively offset forwardly of respective lower forward and rearward sprockets 104 and 106, to provide connecting sloping front and rear chain runs, as clearly shown in FIG. 1. The sprockets 100, 102, 104 and 106 are respectively fixed on respective stub shafts 108, 110, 112 and 114 journaled in suitable bearings carried by the inner sheets 34 of the compartments 30 and 32.

In order to permit the pans being delivered to the front of the oven by the transversely extending endless infeed conveyor 46 to pass beneath the lower run of the pusher bar operating chains 98, the sprockets 104 and 106 are disposed a vertical distance above the pan supporting surface of the infeed conveyor 46 greater than the height of the highest pans conveyed. The lower runs of the chains 98 are retained in longitudinally extending tracks 116, and the upper runs of the chains 98 are retained in longitudinally extending track assemblies 118 to prevent sagging or buckling of the chains 98. The track assemblies 116 and 118 are rigidly supported in any suitable manner on the inner faces of the inner sheets 34 of the compartments 30 and 32.

The transversely extending pusher bar 96 is connected at its ends by carriages 120 to the chains 98. The carriages 20 each includes a longitudinally extending carriage arm 122 having at its forward end a laterally outwardly extending pintle 24 through which it is pivotally connected to a chain 98. At their free ends, the carriage arms 122 are provided with depending carriage flanges 126 to the lower rearward ends of which the ends of the transversely extending pusher bar 96 are rigidly secured in any suitable manner. The upper rearward end portions of carriage flanges 126 are provided respectively with a laterally outwardly extending stub shaft 128 carrying an outboard roller 130, as best shown in FIG. 5. The rollers 130 are arranged on the pushing or extending stroke of the pusher bar 96 to engage inwardly projecting flange extensions 132 of the track assemblies 116 to support the pusher bar 96 in close proximity above the pan supporting surface 44 on its pushing stroke.

The track assemblies 118 are provided with inwardly projecting track flange extensions 134 subjacent the upper runs of the chains 98 engageable by the outboard rollers 130 to support the pusher bar 96 in elevated position on its retracting or return stroke. In order to permit the pusher bar 96, on its retracting stroke, to move upwardly from the level of the pan supporting surface 44 to the level of the guide tracks 134, the latter are provided at their rearward ends with downwardly biased hinged track switches 136. Referring to FIG. 1 showing a track switch 136 at one side of the pan transfer device 10, it is apparent that the outboard rollers 130 engage and pass under the track switches 136 on the pushing stroke of the pusher bar 96 to the position depicted, and roll upwardly along the track switches 136 on the retracting stroke of the pusher bar 96 to the guide tracks 134. As the pusher bar 96 approaches the end of its retracting stroke, the outboard rollers 130 are arranged to roll down downwardly sloping portions 138 of the guide tracks 134, and when the pivotally mounted ends of the carriage arms 122 round the upper sprockets 110 and descend around the lower sprockets 104, the outboard rollers 130 engage and are guided down the guide plates 140 to lower the pusher bar 96 back to its lower run, ready for another cycle of operation.

The operation of the pusher bar 96 is synchronized with operation of the oven tray conveyor 14 and is arranged to complete one cycle of operation, as described above, for each travel of the tray conveyor through one tray space, or otherwise expressed, for travel of a tray from a position, as shown in FIG. 1, occupied by tray 16b to a position shown occupied by tray 16a. The means for operating the pusher bar 96 in synchronism with the tray conveyor 14 includes a sprocket 142 mounted on an extension of a tray conveyor shaft, as for example shaft 144, FIGS. 1 and 6. A sprocket chain 146 is trained around sprocket 142 and around a sprocket 148 on a transversely extending jackshaft 150 extending at its ends into the compartments 30 and 32. Completing the drive means to the pusher bar operating chains 98, are sprocket chains 152 trained around sprockets 154 on the ends of the jackshaft 150 and sprockets 156 on extensions of the stub shafts 112.

While the pusher bar 96 is operated continuously, the infeed conveyor 46, as previously noted, operates intermittently since the infeed conveyor 46, upon travel thereacross by the pusher bar 96, must be at rest. The receiving end of the infeed conveyor 46 extends into the compartment 30 through an opening 158 in the inner wall 34 of the compartment 30. Suitable pan collecting, grouping and releasing means, well known in the art, as shown for example in Hershey U.S. Pat. No. 3,428,163, and indicated as a whole by the reference numeral 160, is employed for releasing successive groups of pans to the infeed conveyor 46.

The infeed conveyor 46 is arranged to be started each time the pusher bar 96 has traversed the infeed conveyor 46 and preferably before it has reached the end of its extending or pushing stroke and stops when it has operated through one measured linear travel. This one measured linear travel is distance such as to convey the leading pan of a row of pans from the receiving end of the infeed conveyor to the position x in FIG. 3, thereby assuring disposition of a row of pans in front of the pusher bar 96.

The infeed conveyor 46 must operate at a speed to present a full row of pans to the pusher bar 96 on each pushing stroke in order to transfer a row of pans onto each tray 16 of the tray conveyor 14. Assume for example that the tray conveyor 14 is operated at a speed to advance the trays through one tray space in 15 seconds. For each travel of a tray through one tray space, the pusher bar 96 must complete a cycle in the same time in order to push a row of pans into each tray, in other words in 15 seconds. With the pusher bar making a complete cycle in 15 seconds, assume now that it takes 4 seconds to travel across the infeed conveyor 46 to push the pans thereacross, for at least which time the infeed conveyor 46 must be at rest. Assume now that the aforesaid one measured linear travel of the infeed conveyor to present a full row of pans (the number of pans that can be accommodated on a tray 16 of the tray conveyor 14) in front of the pusher is 160 inches. It is therefore necessary for the infeed conveyor to travel this distance in at least 11 seconds or approximately 14½ inches per second. Of course this speed can be increased if desired, resulting merely in a longer rest period for the infeed conveyor 46.

The operation of the infeed conveyor 46 is synchronized with the operation of the tray conveyor 14 and for this purpose a sprocket chain 162 disposed between the inner and outer sheets of the oven 12 is trained around a sprocket 164 mounted on one end of the tray conveyor shaft 144 and a sprocket 166 mounted on a cam shaft 168, FIGS. 1 and 6. Fixed on the cam shaft 168 is a cam 170 arranged to make one revolution for each movement of the tray conveyor 14 through one tray space and consequently one revolution for each cycle of operation of the pusher bar 96. The cam 170 is provided with a detent 172 arranged to be engaged by cam switch CS-174, closing the same to initiate operation of infeed conveyor motor M-1 when, as before noted, the pusher bar 96 has traversed the infeed conveyor 46. Referring to FIGS. 7 and 9, the cam 170 is shown in position conforming with the position of the pusher bar 96 and tray conveyor 14 as shown in FIG. 1, from which it will be noted that the cam 170 has turned in counterclockwise direction a distance beyond the point at which cam switch CS-174 engaged detent 172 to start the infeed conveyor motor M-1, so that cam switch CS-174 has reopened. However, while cam switch CS-174 is now open, motor M-1 remains energized, through control means now to be described.

Mounted on an extension of the infeed conveyor shaft 58 is a sprocket 176, around which sprocket and a sprocket 178 is trained a sprocket chain 180 for driving a cam shaft 182, as best shown in FIGS. 2 and 3. The relation of sprockets 176 and 178 is such that cam 184 on the cam shaft 182 makes one revolution for the previously described one measured linear travel of the infeed conveyor 46, the distance required to move the leading pan of a group of pans from the receiving end of infeed conveyor 46 to the index line x in FIG. 3. The relation of cams 170 and 184 is such that when cam switch CS-174 opened, engagement of cam switch CS-186 with the high part of cam 184 effected closing of cam switch CS-186 to retain the infeed conveyor motor M-1 energized. Now, when the infeed conveyor 46 has completed its one measured linear travel, cam switch CS-186 engages the detent 188 of cam 184 to open cam switch CS-186 and stop the motor M-1. Motor M-1 will now remain deenergized until cam switch CS-174 again engages detent 172 to restart motor M-1.

As above pointed out, the infeed conveyor 46 is stopped each time a row of pans is conveyed into position in front of the oven loading opening for at least during such time as the pusher bar 96 traverses the infeed conveyor 46 to push the row of pans therefrom on the extending or loading stroke of the pusher bar 96. Such stopping of the infeed conveyor 46 is necessary in order to prevent dislocation of the pans as they are being pushed by the pusher bar 96. Abrupt stopping of the infeed conveyor 46, particularly with the present day trend toward higher production rates necessitating higher conveyor speeds, has in prior installations resulted in haphazard inertial movement of the pans relative to the conveying surface of the infeed conveyor, resulting not only in violent collision of the pans with consequent collapse and damage to the proofed dough, but also in dislocation of the pans so that they are not disposed in uniform spaced relation in their travel through the oven, impairing uniform heat circulation with consequent nonuniform baking of the dough products.

In order to prevent or render negligible such problems of pan orientation and dislocation, a plurality of longitudinally spaced transversely extending electromagnets 190 are disposed beneath the top run of each of the endless conveyors 48 and 50. Referring to the endless conveyor 48, it being understood that this applies in similar manner to endless conveyor 50, a pair of parallel longitudinally elongated planar support track plates 192 and 194 formed of a magnetic material are provided for the upper pan supporting run of the conveyor 48 to prevent sagging thereof, and extend from adjacent the sprocket 54 at one end of the conveyor 48 to adjacent the sprocket 64 at the other end of the conveyor 48. The support track plates 192 and 194 are provided with longitudinally extending vertical depending flanges 196 and 198, as best shown in FIG. 4, bolted or otherwise secured in suitable manner to brackets 200 carried by the crossbars 202. The lower run of the conveyor 48 is supported by a longitudinally extending channel member 204 bolted or otherwise secured through its flanges 206 to the crossbars 202.

The ends of the electromagnets 190 beneath the conveyor 48 are secured at their ends to the flanges 196 and 198 of the conveyor support track plates 192 and 194 forming poles for the electromagnets 190 separated by the airgap 208 between the plates 192 and 194 to thereby provide a concentrated magnetic field directly under the pans. It is, of course, to be understood that a similar arrangement is provided for the electromagnets 190 beneath the conveyor 50.

The electromagnets 190 are oriented in such manner that all poles of one plurality are connected with the pole piece 198 beneath the conveyor 48, and all the poles of opposite polarity are connected with the pole piece 196 beneath the conveyor 48. The electromagnets 190 beneath the conveyor 50, it is understood, are similarly oriented. The electromagnets 190 are also preferably oriented in such manner that the adjacent pole pieces 198 of the two rows of pole pieces have the same polarity to prevent short circuiting of the magnetic lines of force and weakening of the magnetic field strength across the gaps 208.

Referring to FIG. 9, the means for energizing the electromagnets 190 includes a transformer 210 connected between the lines L-1 and L-2. The transformer 210 is connected to the AC terminals of a suitable commercially available rectifier 212. The positive line 214 connects a DC terminal of the rectifier 212 with the remote ends of the oils of the electromagnets 190 under each of the conveyors 48 and 50 and the negative line 216 connects the other DC terminal of the rectifier 212 with the adjacent ends of the coils of the rectifier 212 with the adjacent ends of the coils of the electromagnets 190 under each of the conveyors 48 and 50.

The means for controlling energization and deenergization of the electromagnets includes a normally open contact C-1 in the positive line 214 which is arranged to close simultaneously with initiation of operation of the infeed conveyor 46 to energize the electromagnets 190. Energization of the electromagnets 190, as previously pointed out, increases the pressure of the pans against the infeed conveyor 46 above their normal weight to prevent or minimize relative movement between the pans and the infeed conveyor as the pans are conveyed.

With the various elements in the position shown in FIG. 1, operation of the infeed conveyor 46, as previously described, has already been initiated, so that energization of motor M-1 starter M-1S has closed M-1 starter contact M-1SC of off delay time delay TD, closing time delay contact TD-C to energize contactor coil C and close its contact C-1. When previously described cam 184 has completed its revolution (during which infeed conveyor 46 has traveled its previously described one linear travel), cam switch CS-186 reopens, thereby deenergizing motor M-1 starter M-1S, in turn opening M-1 starter contact M-1SC, time delay contact TD-C and contact C-1 of contactor coil C, the electromagnets 190 are deenergized. The pans can now be freely pushed off the infeed conveyor 46 when the latter is traversed on the next pushing stroke of the pusher bar 96.

The time delay TD delays opening of time delay contact TD-C for a preset time when M-1SC opened, to thereby maintain the electromagnets 190 energized for a short time after the infeed conveyor has stopped, thus insuring against relative movement of the pans with respect to the infeed conveyor 46 if the latter should for any reason be slightly delayed in stopping.

I claim:
1. In a baking oven provided with a loading opening:
   a transversely extending endless pan conveyor formed of a nonmagnetic material for advancing successive groups of pans from one side of said oven to a position in front of said loading opening:
   a pusher movable on a pan pushing stroke traversing said endless pan conveyor and on a return stroke at an elevation above said endless pan conveyor;
   control means initiating operation of said endless pan conveyor after each traverse of said pusher across said endless pan conveyor;
   control means for arresting operation of said endless pan conveyor upon travel thereof through a linear distance to present a row of pans to said loading opening and prior to the next traverse of said endless pan conveyor by said pusher;
   a plurality of longitudinally spaced transversely extending electromagnets disposed beneath said endless pan conveyor providing when energized a magnetic field between the poles thereof in the path of said pans; and
   control means for energizing said electromagnets upon initiation of operation of said endless pan conveyor and for deenergizing said electromagnets when said endless pan conveyor has completed its travel through said linear distance, whereby to substantially increase the pressure of said pans against said endless pan conveyor during starting, stopping and running time thereof.

2. Apparatus in accordance with claim 1 wherein said last named control means includes time delay means for delaying deenergization of said electromagnets for a short time after cessation of operation of said endless pan conveyor.

3. In a baking oven provided with a loading opening:
   an endless tray conveyor in said oven having equidistantly spaced apart trays including a generally vertical run adjacent said loading opening:
   a transversely extending endless pan conveyor formed of a nonmagnetic material for advancing successive groups of pans from one side of said oven to a position in front of said loading opening:
   a pusher movable on a pan pushing stroke traversing said endless pan conveyor and on a return stroke at an elevation above said endless pan conveyor;
   means for operating said pusher in timed relation with said oven tray conveyor through a pan pushing and return stroke cycle for each travel of said tray conveyor through one tray space for pushing successive rows of pans on successive pushing strokes of said pusher onto successive trays of said tray conveyor;
   control means initiating operation of said endless pan conveyor after each traverse of said pusher across said endless pan conveyor;
   control means for arresting operation of said endless pan conveyor upon travel thereof through a linear distance to present a row of pans to said loading opening and prior to the next traverse of said endless pan conveyor by said pusher;
   a plurality of longitudinally spaced transversely extending electromagnets disposed beneath said endless pan conveyor providing when energized a magnetic field between the poles thereof in the path of said pans; and
   control means for energizing said electromagnets upon initiation of operation of said endless pan conveyor and for deenergizing said electromagnets when said endless pan conveyor has completed its travel through said linear distance, whereby to substantially increase the pressure of said pans against said endless pan conveyor during starting, stopping and running time thereof.

4. Apparatus in accordance with claim 3, including means for continuously operating said tray conveyor and said pusher.

5. In a baking oven provided with a loading opening:
   an endless tray conveyor in said oven having equidistantly spaced apart trays including a generally vertical run adjacent said loading opening:
   a transversely extending endless pan conveyor formed of nonmagnetic material for advancing successive groups of pans from one side of said oven to a position in front of said loading opening;
   a pusher movable on a pan pushing stroke traversing said endless pan conveyor and on a return stroke at an elevation above said endless pan conveyor;
   means for operating said pusher in timed relation with said oven tray conveyor through a pan pushing and return stroke cycle for each travel of said tray conveyor through one tray space for pushing successive rows of pans on successive pushing strokes of said pusher onto successive trays of said tray conveyor;
   control means initiating operation of said endless pan conveyor after each traverse of said pusher across said endless pan conveyor;
   control means responsive to initiation of operation of said endless pan conveyor for maintaining operation of said endless pan conveyor and arresting operation of said endless pan conveyor upon travel thereof through a linear distance to present a row of pans to the loading opening and prior to the next traverse of the endless pan conveyor by said pusher;
   a plurality of longitudinally spaced transversely extending electromagnets disposed beneath said endless pan conveyor providing when energized a magnetic field between the poles thereof in the path of said pans; and
   control means for energizing said electromagnets upon initiation of operation of said endless pan conveyor and for deenergizing said electromagnets when said endless pan conveyor has completed its travel through said linear distance, whereby to substantially increase the pressure of said pans against said endless pan conveyor during starting, stopping and running time thereof.